United States Patent
Hoff (10) Patent No.: US 11,186,439 B2
(45) Date of Patent: Nov. 30, 2021

(54) CHAIN CONVEYOR CURVE

(71) Applicant: Jonge Poerink Conveyors B.V., Borne (NL)

(72) Inventor: Egbert Gerrit Hoff, Wierden (NL)

(73) Assignee: JONGE POERINK CONVEYORS B.V., Borne (NL)

( * ) Notice: Subject to any disclaimer, the term of this patent is extended or adjusted under 35 U.S.C. 154(b) by 0 days.

(21) Appl. No.: 16/980,932

(22) PCT Filed: Feb. 27, 2019

(86) PCT No.: PCT/NL2019/050126
§ 371 (c)(1),
(2) Date: Sep. 15, 2020

(87) PCT Pub. No.: WO2019/177455
PCT Pub. Date: Sep. 19, 2019

(65) Prior Publication Data
US 2020/0407169 A1    Dec. 31, 2020

(30) Foreign Application Priority Data
Mar. 16, 2018   (NL) .................................. 2020605

(51) Int. Cl.
| | |
|---|---|
| *B65G 21/16* | (2006.01) |
| *B65G 15/10* | (2006.01) |
| *B65G 17/38* | (2006.01) |
| *B65G 23/04* | (2006.01) |
| *B65G 23/12* | (2006.01) |
| *B65G 17/08* | (2006.01) |
| *B65G 21/22* | (2006.01) |
| *B65G 23/06* | (2006.01) |
| *B65G 15/02* | (2006.01) |

(52) U.S. Cl.
CPC ............. *B65G 21/16* (2013.01); *B65G 15/10* (2013.01); *B65G 17/086* (2013.01); *B65G 17/38* (2013.01); *B65G 21/22* (2013.01); *B65G 23/04* (2013.01); *B65G 23/06* (2013.01); *B65G 23/12* (2013.01); *B65G 15/02* (2013.01)

(58) Field of Classification Search
CPC ........ B65G 21/16; B65G 15/10; B65G 17/38; B65G 23/04; B65G 23/12; B65G 23/06; B65G 17/086; B65G 15/02; B65G 23/10; B65G 15/62; B65G 21/22
USPC ................................ 198/831, 839, 841, 817
See application file for complete search history.

(56) References Cited

U.S. PATENT DOCUMENTS

| | | | | |
|---|---|---|---|---|
| 1,206,305 | A | * | 11/1916 | Cowley .................... 198/817 |
| 1,245,941 | A | * | 11/1917 | Snow ...................... D06F 79/00 |
| | | | | 248/117.5 |
| 3,620,355 | A | * | 11/1971 | Jones, Jr. ................ B65G 15/02 |
| | | | | 198/831 |

(Continued)

FOREIGN PATENT DOCUMENTS

FR    2242311 A1    3/1975

*Primary Examiner* — Mark A Deuble
(74) *Attorney, Agent, or Firm* — The Webb Law Firm (57) ABSTRACT

The invention relates to a transport conveyor curve including a multitude of parallel curved tracks, wherein the separate parallel tracks are driven by a conical drive, wherein the contact angle of each of the individual tracks with the conical drive is substantially equal in comparison to the contact angle of the other individual tracks.

13 Claims, 10 Drawing Sheets

(56) References Cited

U.S. PATENT DOCUMENTS

| | | | | |
|---|---|---|---|---|
| 3,939,964 | A | * | 2/1976 | Poerink ................. B65G 17/08 198/853 |
| 3,963,780 | A | * | 6/1976 | Manning ....................... 564/374 |
| 4,887,708 | A | * | 12/1989 | Brown ................... B65G 15/02 198/831 |
| 5,217,110 | A | | 6/1993 | Spangler et al. |
| 5,415,273 | A | * | 5/1995 | Peterson ................ A01D 17/10 198/831 |
| 5,992,615 | A | * | 11/1999 | Muchalov .............. B65G 15/02 198/831 |
| 7,246,967 | B2 | * | 7/2007 | Iseli ........................ F16B 2/065 403/400 |
| 7,832,549 | B2 | * | 11/2010 | Honeycutt ............. B65G 15/62 198/831 |
| 9,073,696 | B2 | * | 7/2015 | Hagmaier ............. B65G 15/60 |
| 2006/0163040 | A1 | * | 7/2006 | Lee ....................... B65G 23/06 198/831 |

* cited by examiner

Prior Art

CHAIN CONVEYOR CURVE

CROSS-REFERENCE TO RELATED APPLICATIONS

This application is the United States national phase of International Application No. PCT/NL2019/050126 filed Feb. 27, 2019, and claims priority to The Netherlands Patent Application No. 2020605 filed Mar. 16, 2018, the disclosures of which are hereby incorporated by reference in their entirety.

BACKGROUND OF THE INVENTION

1. Field of the Invention

The invention relates to a chain conveyor curve.

More specifically, the invention relates to a chain conveyor curve with a small curvature radius. These curves typically have their own dedicated chain, spanning typically only the curve and thus having a transfer at the intake and offtake ends of the chain to straight or less curved sections of a conveying system.

2. Discussion of the Related Art

In the art, conveyors are frequently used for transportation of bottles, cans, various kinds of good, such as edible products, potable products and or other goods. When the tracks or chains of these conveyors are moved through a bend, the pitch of the individual links is greater at the outer circumference of the bend and smaller at the inner circumference of the bend.

Thus, with conveyors in the art, at relative tight curves or curves with a limited radius, the individual links may open-up at the outer side of the track curve while similarly get maximally compressed and nested at the inner side of the track curve. Thus below a specific radius, ordinary conveyor chains are not suitable for being guided through the curve.

Here dedicated curved tracks are used, equipped with dedicated chain links that are typically wedged shaped, where the outer lateral side of the conveyor chain comprises the wider portions of the individual links and the inner lateral side of the conveyor chain comprises the smaller width portions of the individual links.

Thus, this dedicated conveyor chain can only move in the bend, and is not suited to move through straight parts of the conveying system. As a consequence, the curved section of this conveyor comprises a return part, moving below the transport part of the conveyor chain. At both transport ends, i.e. at the intake and/or the offload end of the conveyor track conical members such as a conical return idler or a conical drive is arranged. Alternatively, a set of fixed return guiders can be arranged around which the conveyor chain can be guided.

Thus, the transport part and the return part are moving along a similar track, being held in place amongst others by two conical members or a set of return guiders.

A serious draw back of these chains is that when broader chains are needed, the width of the individual chain links at the outer curve side of the chain tend to get relative large, resulting in a bumpy, ratcheting unsmooth transfer, a phenomenon also known as the polygon effect. Furthermore, the wider the chain links, the larger the diameter of the conical members or guiders at both the intake and offload side of the chain need to be, in order to guide the chain. A larger diameter of the conical members or of the return guiders leads to a larger gap between the corresponding feed in and offtake conveyors.

The rotating axis of the conical member needs to be pointing towards the centre point of radius of the curve in order to have a smooth motion of the conveyor belt. Yet when broad conveyor chains are used, the outer side of the conical member needs a larger diameter and thus more space at the outside of the bend than at the inside, such that gaps between feed in and offtake conveyors is wedge shaped. This effect also limits the width of the conveyor belt.

A last effect that limits the width of the conveyor belt is the relative large width of the links at the outer side of the curve, leading to unsmooth, ratcheting or bumpy transferral of goods at the outer side of the curve, an effect known as polygon effect.

Thus, these conveyors are only practical below a maximal conveyor track width. As a result, these conveyors can be a limiting factor in the output volume of a production line in which these conveyors are applied.

Accordingly, it is an object of the invention to mitigate or solve the above described and/or other problems of conveyors chains in the art, while maintaining and/or improving the advantages thereof.

More specifically the object of the invention can be seen in providing a curved conveyor chain that is more practical in use, of which the gaps at intake and offload ends of the conveyor can remain relatively small, while the transporting width can be relatively wide and potentially be extended.

SUMMARY OF THE INVENTION

These and/or other objects are reached by a transport conveyor curve comprising a multitude of parallel curved tracks; wherein the separate parallel tracks are driven by a conical drive, wherein the contact angle of each of the individual tracks with the conical drive is substantially equal in comparison to the contact angle of the other individual tracks.

This substantially equal contact angle is configured in order to have the individual tracks move with a corresponding angular speed through the curve. Thus, any product transported on the conveyor curve will experience a smooth transport, where speed differences between the separate individual conveyor tracks is reduced or absent. In this way products experience limited forces induced by the individual conveyor tracks moving relative to each other.

The separate parallel tracks can comprise wedge-shaped links, wherein the angle of the wedge of the wedge-shaped links is smaller of an outer track, when compared with the angle of the wedge of the wedge-shaped link of a more inner track. By the reduced angle, the pitch or the width of the links at the curve outside is reduced as well, such that the polygon effect is reduced leading to a smoother, less rattling transfer can be obtained. The conical drive can be arranged in a return part of the conveyor track. If the conical drive is arranged in the return part, below the transport surface, the separate individual tracks can have a corresponding angular velocity in the track, without the wide gap, which usually exists with a conical drive installed at one of the transfer sides of the conveyor, i.e. at the intake or the offload side.

The conical drive can be a conical drum or a series of drive gears or sprockets with a, towards the direction of the outside ascending diameter. In case the conveyor track is a continuous belt, a drum would make a better frictional transfer of motion than a set of sprocket wheels. In case of a chain link conveyor, a series of sprocket wheels would give a better transfer of motion.

The drive gears or sprockets can have an increasing diameter and/or number of teeth towards the outside of the curve. Since the links of the individual separate conveyor tracks have different pitch angles relative to the pitch angles of the links of the other separate conveyor tracks, the number of teeth on the sets of sprocket wheels need to be adapted as well. Thus, the outer sets of sprocket wheels, on the curve outside typically have more teeth than the sets of sprocket wheels on the inside. By the different diameter and number of teeth, the individual conveyor tracks can move in a substantially corresponding angular velocity through the curve.

The returns of the conveyor can comprise a series of idlers, wherein each parallel track comprises its own set of idlers. The distance in vertical direction of each set of idlers increases towards the outside of the curve in order to compensate for the differences in path length of the individual conveyor tracks. Thus, the diameter of the idlers towards the curve outside can be of comparable diameter resulting in that the transfer of the conveyor can approximate a cylindrical transfer.

Alternatively, the returns can comprise a series of guiders, wherein the guiders can comprise two rounded edges. The rounded edges are placed one above the other, and can guide the individual tracks around a first rounded edge from a laying plane, in a direction downward, and around a second rounded edge again in a laying plane, moving back in opposite direction. The distance between the rounded edges from each guider increases towards the outside of the curve, in order to compensate for the differences in path length of the individual conveyor tracks. By means of the idler sets or the guiders, arranged as indicated, the wedge-shaped gap at the intake and offload ends of the transport track can elegantly be reduced, without sacrificing transporting width of the conveyor. Thus, both a smoother transfer and a reduced gap width can be obtained, while the width of the conveyor, and thus its conveying capacity can be extended.

The idlers or guiders of the individual conveyor tracks are configured to run independently from the idlers of the other conveyor tracks. Since the angular speed of the separate tracks is the same, and the length of the individual tracks is larger towards the curve outside, the idlers each rotate in a different rotation velocity.

The individual links of the chain can comprise two sets of hinging pin engaging elements, one set being configured for engaging a leading side hinging pin and one set being configured for engaging a trailing side hinging pin, wherein the two sets of hinging pin engaging elements are connected to a support structure, and wherein the support structure extends on a first side, e.g. a transport surface side relative to the hinging pin engaging elements and the support structure does not extend beyond the hinging pin engaging elements on a second side.

By this arrangement, the hinging pins, when inserted and keeping together two consecutive links, can at sections in between the hinging pin engaging elements, move and be guided, supported and/or borne by guiders, or guiding surfaces.

Thus, the tracks of the transport conveyor can guide smoothly, supported on the hinging pins. This is advantageous, in that the hinging pins have a relative low friction contact surface with the guiders or guiding surfaces, mainly due to their relative small diameter. Thus, the total friction will be relative low, such that less friction losses may occur and less drive power may be needed. Furthermore, wear of the links and the support structure and the guiding surfaces or guiders may be reduced.

The hinging pin engaging elements can comprise a series of ring structures, arranged slanted relative to the transport surface, wherein the ring structures comprise two series of aligned, slanted rings, each configured to engage a hinging pin. By arranging the rings slanted, the manufacturing of the individual links may be less complex. Typically these links are manufactured by means of injection molding. Rings with openings substantially perpendicular to the the opening direction of the mold, by nature comprise undercut sections and require slides or pin inserts in the mold in order to be able to mold the links. By sufficiently slanting the ring containing elements, the rings may be formed, while no undercut is present. Thus no pin inserts or slides may be necessary, which could greatly simplify the molds needed.

Consecutive links in the chain can have hinging pin stoppers on alternating lateral sides of the chain, such that a hinging pin is facing at its first abutting side a first stopper from a first link and at its second abutting side a second stopper from a second link.

Thus, by connecting the consecutive links with the pins, the links snap into connection, where the hinging pins cannot slide out. The snap fit renders the manufacture of the chains easier, since no tools or additional parts are needed to produce the chains.

The conveyor links of each conveyor track are guided by a set of guiders, configured to allow the hinging pins of the conveyor chain to slide along. Thus, the tracks are born on the hinging pins, possibly reducing wear and friction as indicated herein above.

At the turns, the guiders can comprise two rounded edges, configured to guide the tracks around, wherein the distance between the rounded edges increases towards the curve outside of the transport conveyor. Since the hinging pins can slide over the guiders, it further simplifies the design and manufacture of the transport conveyor, while it may reduce wear and possibly, the needed drive power.

The radius of the edges of set the guiders of each track increases towards the curve outside of the conveyor track and the average diameter of the rounded edges of the sets of guiders of each individual parallel tracks is substantially equal compared to the other tracks. In order to guide the individual tracks with the wedge-shaped linkes through the corner, the sliders of each track need to mimic the shape of a set of conical idlers. Thus, the outside guider for each track need to have an increased diameter on the curve outside position. Yet the average radius of the rounded edges of the parallel tracks may be chosen substantially equal, such that the gaps at the intake and offload end remain relatively small. Here the distance between the two rounded edges of the guiders may need to increase, in order to compensate for the higher track length of the tracks towards the curve outside of the transport conveyor.

The conveyor chain is substantially borne by the hinging pins, moving over the guiders. Both in the curves and in the transport part of the individual conveyor tracks, the chains may be guided by the hinging pins sliding over guiders. This can reduce the friction forces and wear as indicated herein above.

BRIEF DESCRIPTION OF THE DRAWINGS

In order to further elucidate the invention, exemplary embodiments will be described with reference to the figures. In the figures.

DETAILED DESCRIPTION OF THE PREFERRED EMBODIMENTS

The figures represent specific exemplary embodiments of the inventions and should not be considered limiting the invention in any way or form. Throughout the description and the figures the same or corresponding reference numerals are used for the same or corresponding elements.

The term ring-shaped is to be considered as, yet not to be seen as limited to an open through-going space surrounded by material, irrespective of the shape. Thus the material may be in the shape of a ring around the through going space, in the shape of an oval, a square, a long hole and/or any specific form suited for the purpose.

Figure 1:
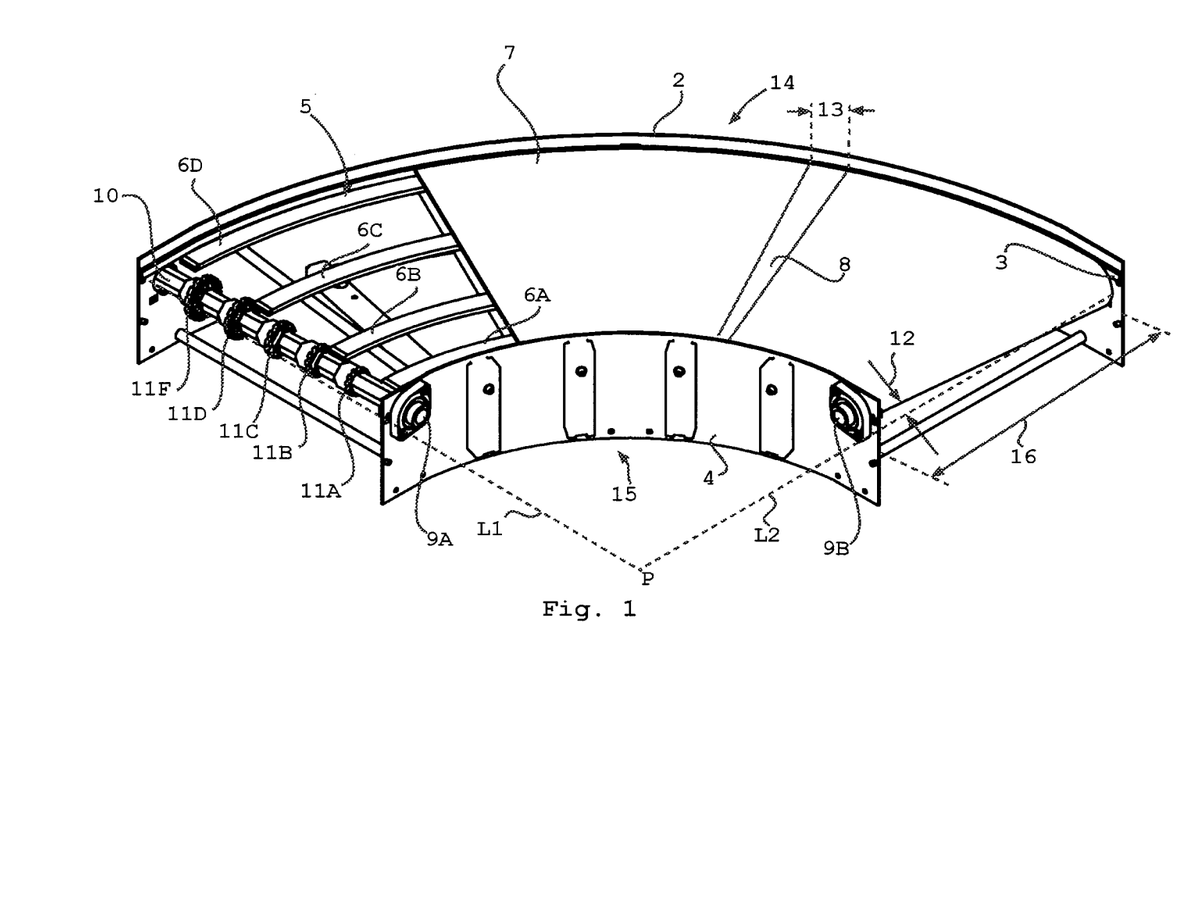
FIG. 1 depicts a first schematic perspective view of a conveyor curve as background information.

FIG. 1 depicts a schematic perspective view of a conventional curved path conveyor 1 for small radius turns. The conveyor 1 comprises a frame 2 having two guiding edges 3 and 4. Guiding edge 3 is located on the curve outside 14 and guiding edge 4 is located on the curve inside 15. In between the guiding edges 3 and 4 is located a support surface 5, comprising a set of curved supports 6A-D. On the curved supports 6A-D a transport chain 7 can slide, being kept in position in horizontal sense by the guiding edges 3 and 4. The conveyor chain 7 comprises a series of wedge shaped hinging links 8. The pitch 13 of the individual links is larger on the curve outside 14 than on the curve inside 15.

The conveyor chain 7 is an endless loop, which for instructive purposes is partially removed. The loop runs between two turns around an idler 9B at a first side and a drive 9A at the other side. The drive comprises a series of sprocket wheels 11A-11E of increasing diameter towards the curve outside 14. The Teeth of the sprocket wheels 11A-11E engage with the hinging pins of the links 8. Since the links get wider towards the curve outside 14, the distance between the dents, accommodating the hinging pins, in the sprocket wheels get correspondingly larger as well towards the curve outside 14. Here typically the number of teeth per sprocket wheel of all the wheels is the same.

Since the shape of the conveyor track 7 is defined by wedge shaped links 8, the conveyor track 7 defines a segment of an annular shaped track, which comprises a return part below a transport part. The outer circumference of the conically shaped drive 9A and a line directed towards an imaginary centre point P defines a wedge-shaped gap 12, of which the diameter is increasing towards the curve inside 15. The larger the width 16 of the track and/or the tighter the curve, the larger the gap 12 will be at the curve inside 15.

The size of this gap at the curve inside 15 can limit the width and the tightness of the curve of the conveyor 1. If the size gets to large, products to be transported on the conveyor 1 may fall through the gap or get stuck in the gap. This can lead to unintentionally product loss and downtime of the conveyor.

The FIGS. 2-5 depicts a schematic perspective view of a set of parallel conveyor tracks 7A, 7B and 7C of a conveyor 1. The tracks 7A, 7B and 7C comprise respectively wedge shaped links 8A, 8B and 8C. The tracks are driven by a set of sprocket wheels 24A-24F having an ascending diameter towards the curve outside 14. The pitch of the links 8A-C in the consecutive corresponding chain tracks 7A-C are substantially corresponding. The pitch of the links of the individual tracks in relation to each other would lie within approximately a margin of 50%. This provides the advantage that the idlers 17A-C, 18A-C, 21A-C and 22A-C where the chain tracks 7A-C turn, can be each of a limited diameter. Thus, the gap 12B, shown in FIG. 4, between the lines L1 and the outer circumference of the idlers 18A-C can be reduced, when compared with the gap 12 between line L1 and the outer circumference of idler 9B and the line L1, shown in FIG. 1.

The idlers 18A-C, 19A-C, 20A-C, 21A-C, 22A-C are each individually and separately from the other idles rotatable. Typically, the idlers 18C-22C on the curve outside 14 will rotate faster than the idlers 18A-22A on the curve inside 15.

Figure 3:
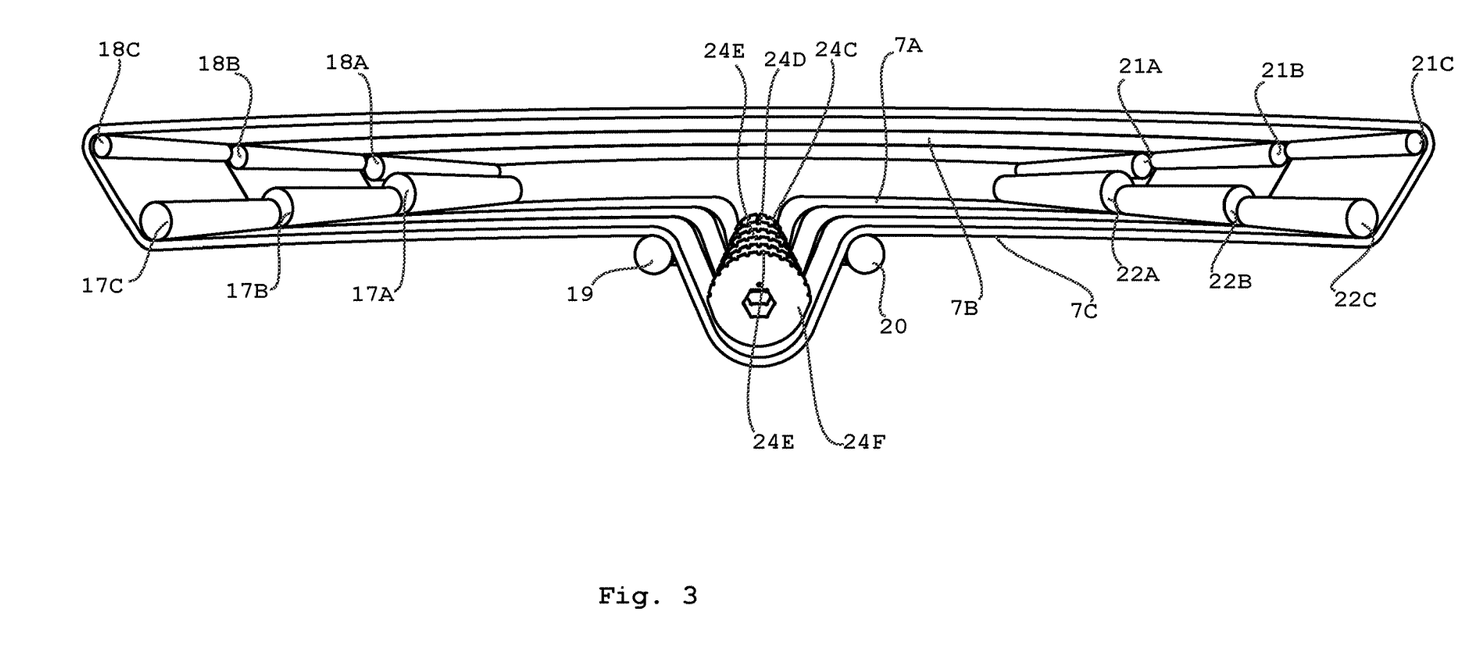
FIG. 3 depicts another schematic perspective view of the curved conveyor according to a first embodiment of the invention.
Figure 5:
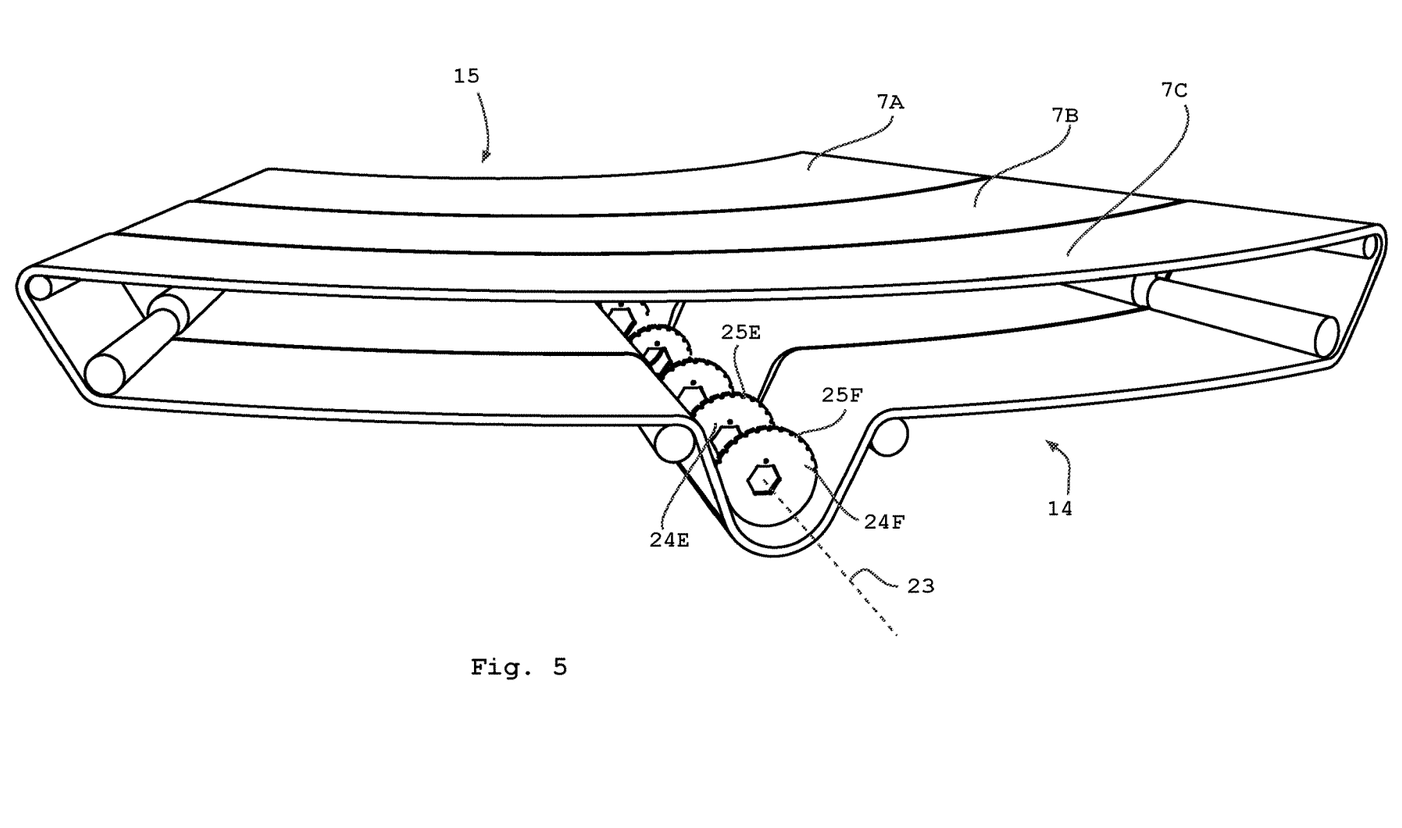
FIG. 5 depicts a schematic perspective view of detail of the curved conveyor according to a first embodiment of the invention.
Figure 6:
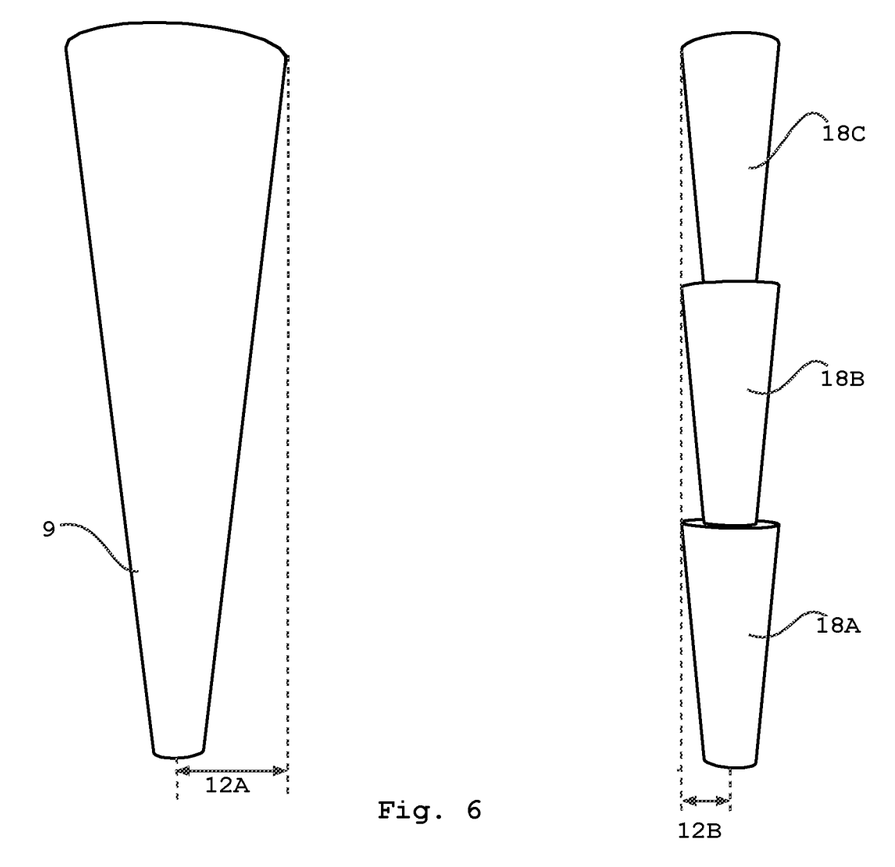
FIG. 6 depicts a schematic perspective view of the return rollers of the curved conveyor according to a further embodiment of the invention.

The chain tracks 7A-7C are driven by a series of shaft mounted sprocket wheels 24A-24F. The sprocket wheels 24A-24F comprise an increasing diameter towards the curve outside 14, as is depicted in FIGS. 3 and 5. The sprocket wheels 24A-B, 24C-D, 24E-F are pairwise coupled to the individual conveyor chain tracks 7A, 7B and 7C respectively. The sprocket wheels 24A-B, 24C-D, 24E-F are pairwise comprising an increasing number of teeth 25A-B, 25C-D, 25E-F to accommodate the hinging pins of the links 8A, 8B and 8C respectively of the individual conveyor chain tracks 7A, 7B and 7C respectively. The contact angle between each of the individual conveyor chain tracks 7A-C and the sprocket wheels is substantially the same, in order to have the conveyor chain tracks 7A-7C each move with substantially the same angular speed through the curve of the conveyor 1.

Figure 7:
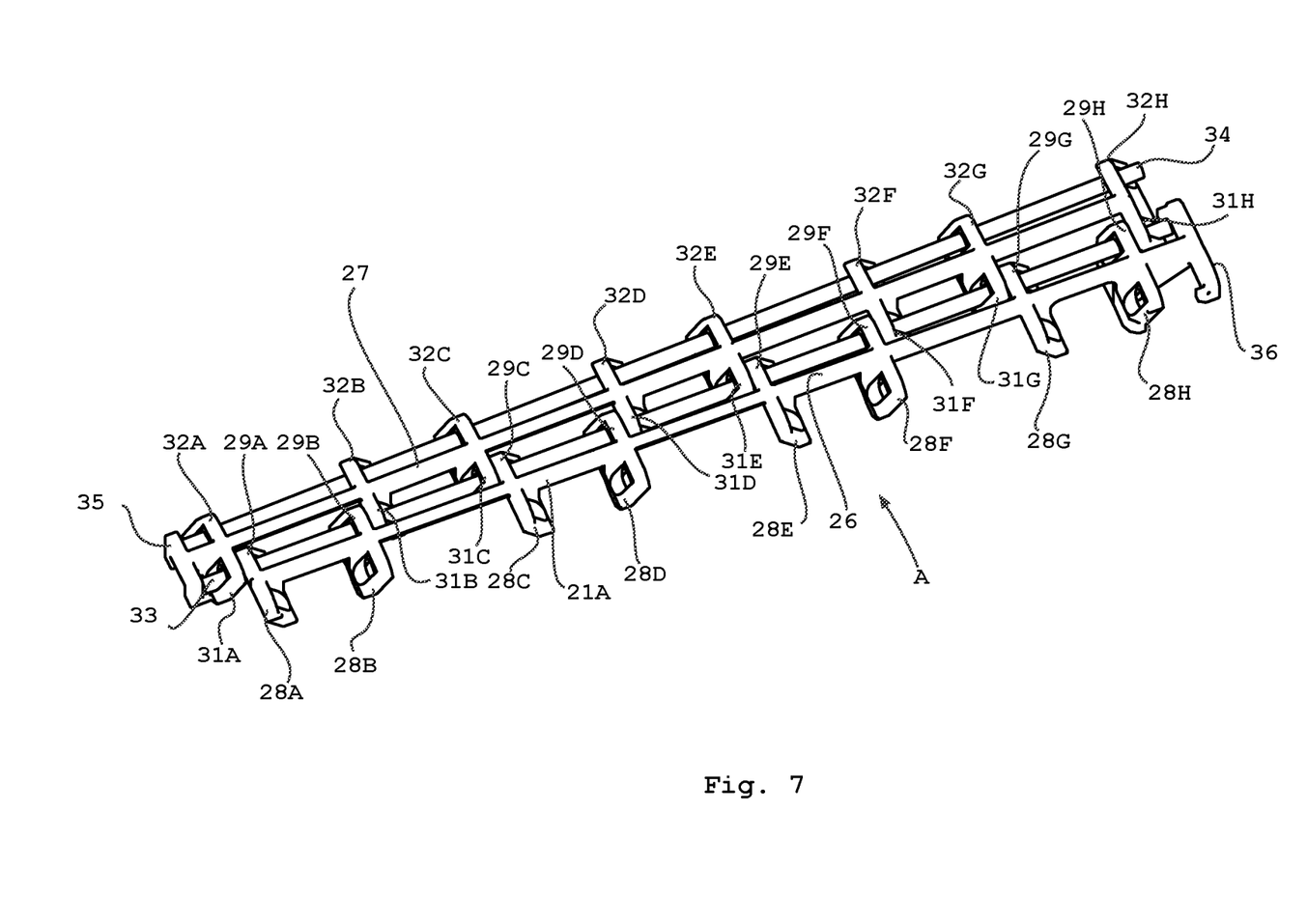
FIG. 7 depicts a schematic perspective view of a set of two links according to a further embodiment of the invention.
Figure 8:
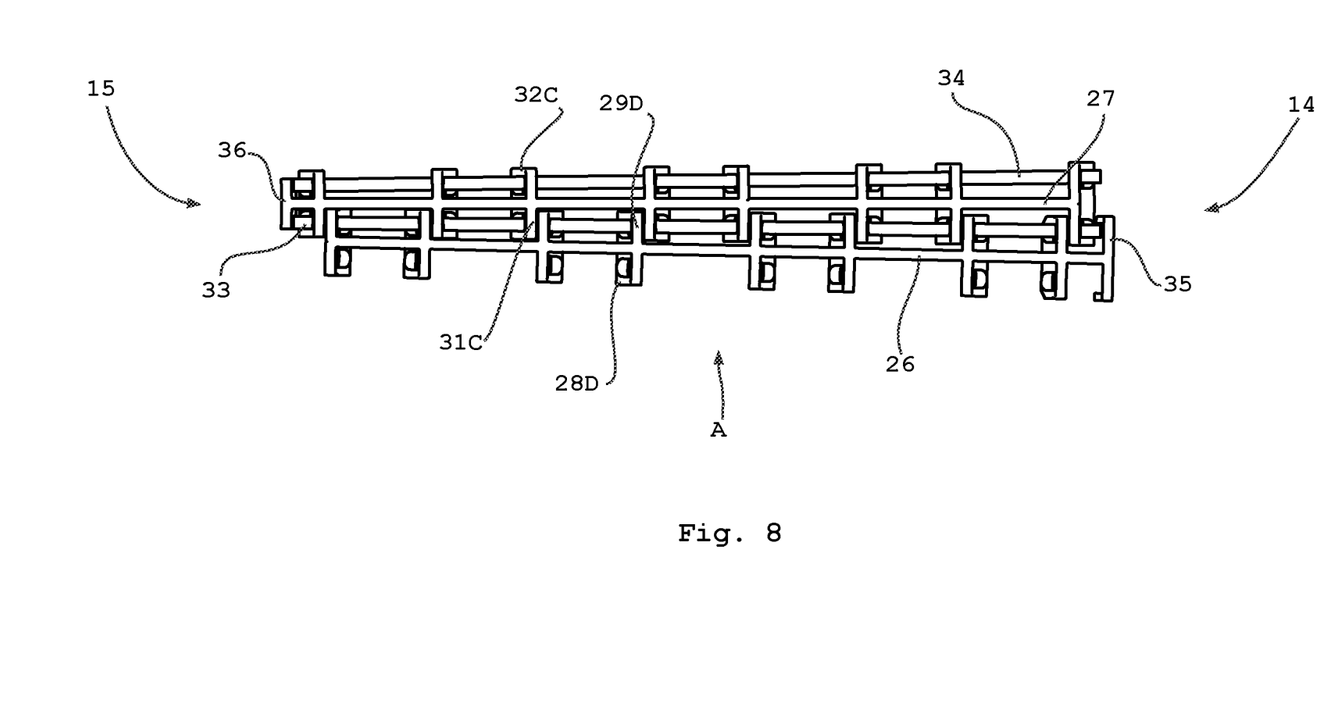
FIG. 8 depicts a schematic topside view of a set of two links according to the embodiment of the invention represented in FIG. 7.
Figure 9:
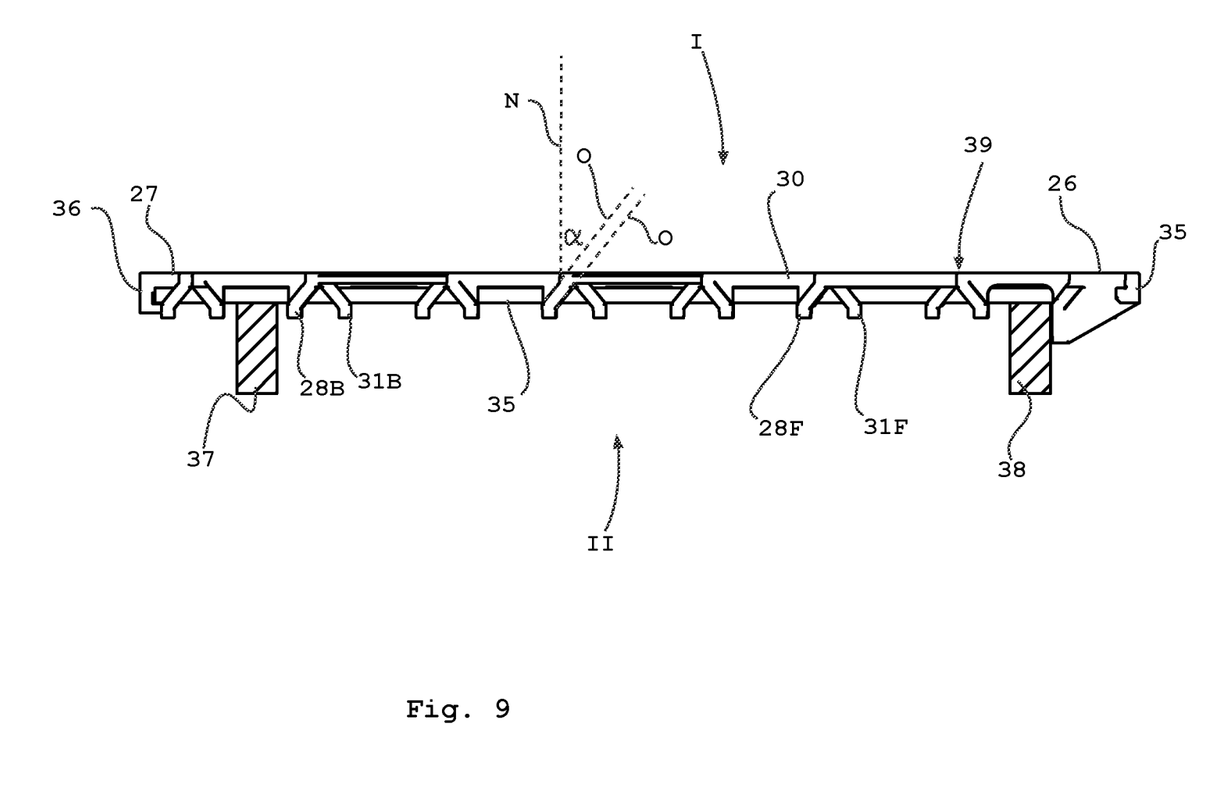
FIG. 9 depicts a schematic front side view of a set of two links according to the embodiment of the invention represented in FIG. 7.

In FIGS. 7, 8 and 9 a set of two links is depicted in various views. The view of FIG. 9 is a front side view, indicated by arrow A in FIGS. 7 and 8. In these figures a set of two links 26 and 27 is depicted. The link 26 comprises two sets 28A-F and 29A-F of hinging pin engaging elements, connected to support structure 30. Each set comprises a set of aligned rings, such that a hinging pin e.g. 33 or 34 can be inserted. The rings of the hinging pin engaging elements comprise surfaces that are slanted relative to the transport surface 39 as is indicated in FIG. 9. Here the line N is the axis perpendicular to the transport surface 39. O is an axis parallel to the slanted surface of the hinging pin engaging elements 28D. The angle □ is chosen such, that the rings have no undercut portions seen in the direction of the line N.

The hinging pins 33 find a stopper 35 of link 26 at a first lateral side of the chain, i.e. the curve outside 14 and a second stopper 36 of link 27 at a second lateral side of the chain, i.e. the curve inside 15. Thus, a link can be snapped in its operating position, if two consecutive links 26 and 27 are provided and linked together. In order to do so, the stoppers 36 or 35 need to be elastically deformed, such to allow the pin 33 to be inserted in the set of hinging pin engaging elements 29A-29H and 31A-31H of links 26 and 27 respectively. Once the end of the pin 33 is passed the stoppers 36 or 35, the stopper in question is allowed to snap back to its original un-deformed state, therewith enclosing the pin 33 and avoiding the pin to escape.

In FIG. 9 a front side view of the set of two links 26 and 27 is depicted. The support structure 30 of link 26, to which the hinging pin engaging elements 28A-H and 29A-H are attached extends beyond the hinging pin engaging elements 28A-H and 29A-H at a first side I, i.e. the side to which support surface 39 is facing.

The support structure 30 does not extend beyond the hinging pin engaging elements 28A-H and 29A-H at a second side II. Thus, the support structure does not extend beyond the hinging pin 33. This allows the hinging 33 and 34 to rest on guiders 37 and 38 of the frame of the conveyor bend. Since the hinging pin engaging elements of the consecutive links are aligned in a transport direction A, all the links 26, 27 can be born on the hinging pins 33 and 34. Thus a smooth transport of the entire belt can be arranged, while the hinging pins are sliding over guiders.

Figure 2:
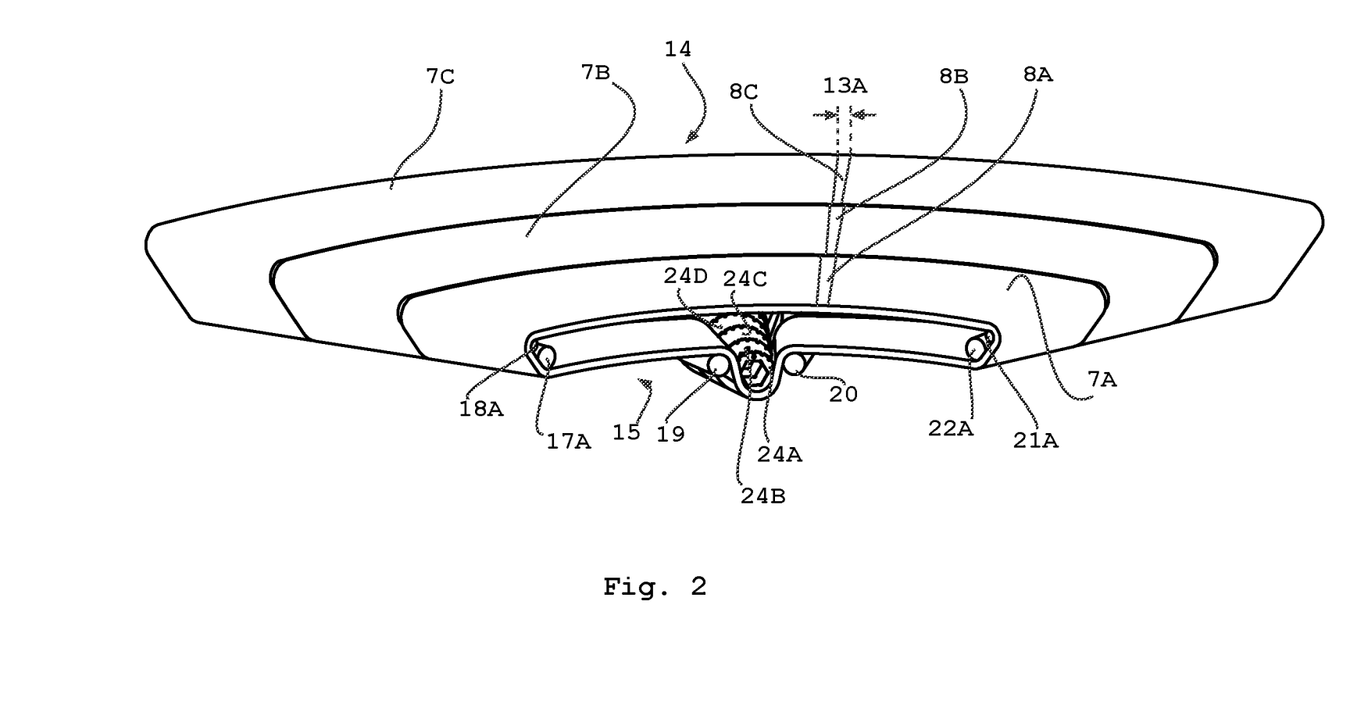
FIG. 2 depicts a schematic perspective view of a curved conveyor according to a first embodiment of the invention.
Figure 4:
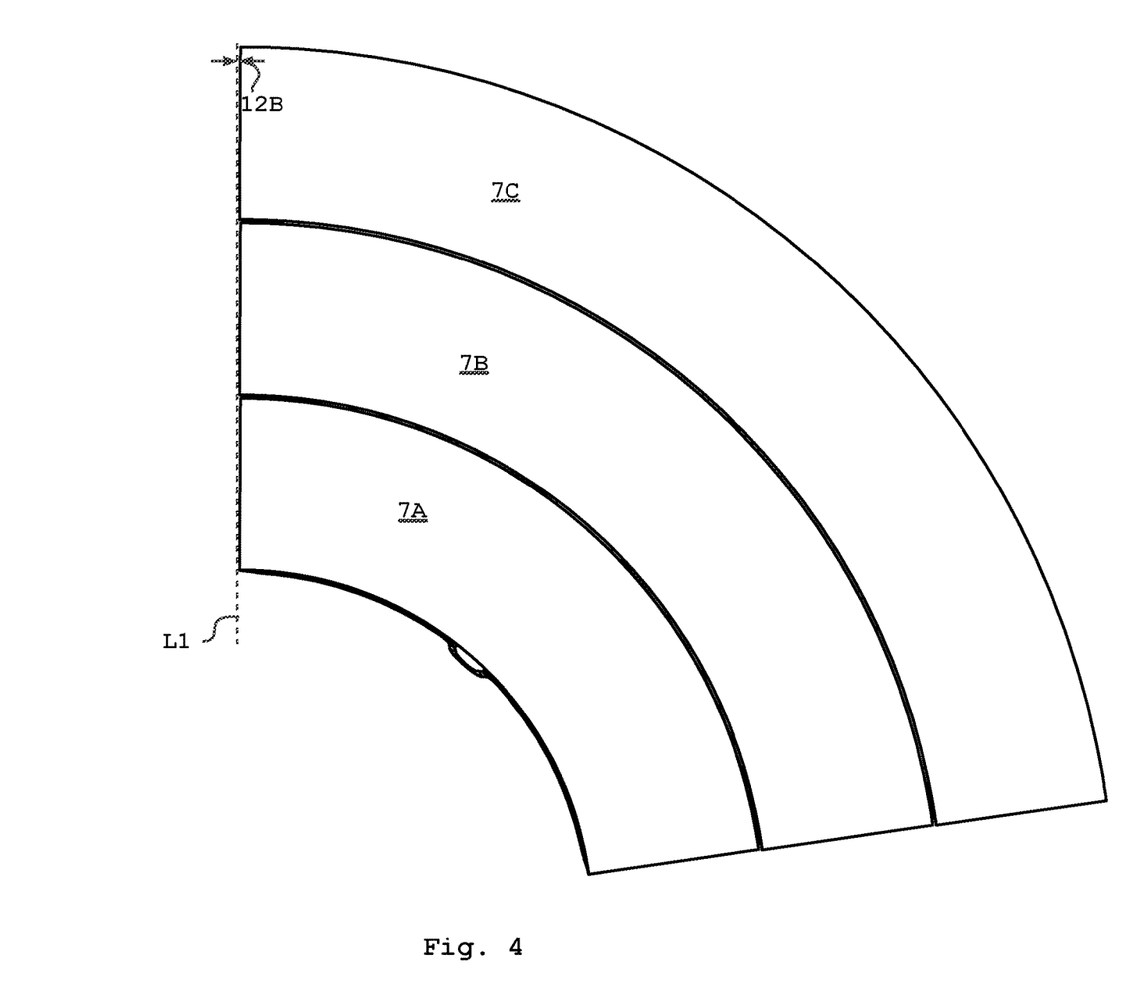
FIG. 4 depicts yet another schematic perspective view of the curved conveyor according to a first embodiment of the invention.
Figure 10:
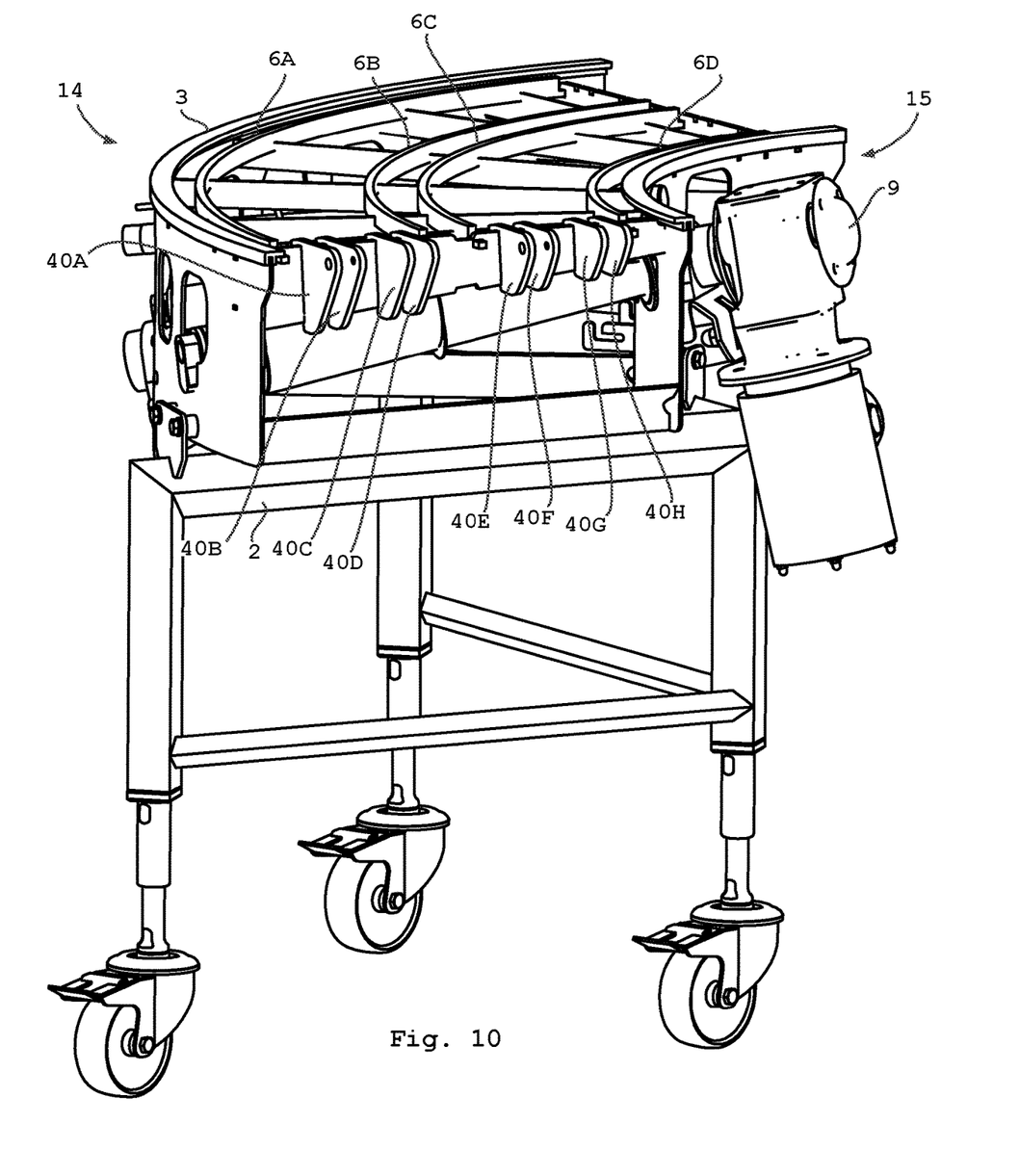
FIG. 10 depicts a schematic perspective view of a conveyor belt curve according to another embodiment of the invention.

In FIG. 10 is depicted a conveyor belt curve in which the set of return idlers 17A-C, 18A-C, 21A-C and 22A-C as depicted in the FIGS. 2-4 can be replaced by a set of guiding shoes 40A-H.

Since the links 26 and 27 can be born by the hinging pins 33 and 34, the guiding shoes 40A-H can allow a return of the individual conveyor tracks while the contact between the links 26 and 27 and the frame 2 predominantly is born by the hinging pins 33 and 34.

Similar to the idlers, the return curves of the inner and the outer tracks are relatively similar. Each of the guiding shoes 40A-H comprise two rounded edges, configured to guide the tracks around. The distance between the rounded edges increases towards the curve outside of the transport conveyor, such that a smooth transport of the chain over the guiders can be obtained. By this increasing distance, the outer belt track is allowed to travel a longer distance between the upper and lower rounded edges, such to compensate for its longer traveling path.

The invention is to be understood not to be limited to the exemplary embodiments shown in the figures and described in the specification. For instance in the description drives are described as a set of sprocket wheels, alternatively, the drive may be a drum, where again the contact angle between the conveyor belt tracks and the drum are substantially equal for all the individual tracks. The links in the various embodiments are depicted as alternating links 26 and 27. Alternatively, also a single-type-link belt for each track may be chosen, where the link engaging elements of the trailing side are sufficiently laterally offset from those hinging pin engaging elements of the leading side of the link, such that they fit in between each other and allow a hinging pin in. Here again at a first lateral side a first stopper and at a second lateral side a second stopper can be arranged such that the pins can only snap in when two links are connected by the pin.

These and other modifications are considered to be variations that are part of the framework, the spirit and the scope of the invention outlined in the claims.

LIST OF REFERENCE SIGNS

1. Conveyor curve
2. frame
3. Guiding edge
4. Guiding Edge
5. Support surface
6A-D. Curved supports
7. Transport chain track
7A-C. Transport chain track
8. Link
9A. Drive
9B. Idler
10. Axis
11A-F. Sprocket wheels
12. Wedge shaped Gap
13. Pitch
14. Curve outside
15. Curve inside
16. Width
17A-C. Idler
18A-C. Idler
19A-C. Idler
20A-C. Idler
21A-C. Idler
22A-C. Idler
23. Drive central axis
24A-F. Sprocket wheel
25A-F. Tooth
26. Link
27. Link
28A-H. Hinging pin engaging elements
29A-H. Hinging pin engaging elements
30. Support structure
31A-H. Hinging pin engaging elements
32A-H. Hinging pin engaging elements
33. Hinging pin
34. Hinging pin
35. Stopper
36. Stopper
37. Guider
38. Guider
39. Transport surface
40A-H. Guiding shoes
□. Angle
N. Axis
P. Centre point
L1. Line
L2. Line
I. First side
II. Second side

The invention claimed is:

1. A transport conveyor curve comprising a multitude of separate parallel curved tracks;
   wherein each separate parallel track of the multitude of parallel curved tracks are driven by a conical drive, wherein a contact angle of each of the separate parallel curved tracks with the conical drive is substantially equal in comparison to the contact angle of the other separate parallel curved tracks,
   wherein the separate parallel curved tracks comprise wedge-shaped links, wherein an angle of the wedge of the wedge-shaped links is smaller of an outer track of the multitude of parallel curved tracks when compared with an angle of a wedge of the wedge-shaped link of a more inner track of the multitude of parallel curved tracks.

2. The transport conveyor curve according to claim 1, wherein a conical drive is arranged in a return part of the conveyor track.

3. The transport conveyor curve according to claim 2, wherein the conical drive is a conical drum or comprise a series of drive gears or sprockets with an ascending diameter towards a direction of an outside of the conveyor curve.

4. The transport conveyor curve according to claim 3, wherein the drive gears or sprockets have an increasing number of teeth and/or an increasing diameter towards the outside of the conveyor curve.

5. The transport conveyor curve according to claim 1, wherein returns of the conveyor comprise a series of idlers or guiders, wherein each parallel track comprises its own idlers or guiders.

6. The transport conveyor curve according to claim 5, wherein the idlers of the individual conveyor tracks are configured to run independently from the idlers of the other conveyor tracks.

7. The transport conveyor curve according to claim 1, wherein the individual wedge-shaped links of the chain comprise two sets of hinging pin engaging elements, one set being configured for engaging a leading side hinging pin and one set being configured for engaging a trailing side hinging pin, wherein the two sets of hinging pin engaging elements are connected to a support structure, and wherein the support structure extends on a transport surface side relative to the hinging pin engaging elements and the support structure does not extend beyond the hinging pin engaging elements on a second side.

8. The transport conveyor curve according to claim 7, wherein the hinging pin engaging elements comprise a series of ring structures, arranged slanted relative to the transport surface, wherein the ring structures comprise two series of aligned, slanted rings, each configured to engage a hinging pin.

9. The transport conveyor curve according to claim 7, wherein consecutive links in the chain have hinging pin stoppers on alternating lateral sides of the chain, such that a hinging pin is facing at its first abutting side a first stopper from a first link and at its second abutting side a second stopper from a second link.

10. The transport conveyor curve according to claim 7, wherein the conveyor links of each conveyor track are guided by a set of guiders, configured to allow the hinging pins of the conveyor chain to slide along.

11. The transport conveyor curve according to claim 10, wherein the guiders comprise two rounded edges, configured to guide the chains of the individual tracks around, wherein the distances between the rounded edges increases towards the curve outside of the transport conveyor.

12. The transport conveyor curve according to claim 11, wherein the radius of the rounded edges of set the guiders of the individual chains of each parallel track increases towards the curve outside of the conveyor track and the average radius of the rounded edges of the sets of guiders of all parallel tracks is substantially equal.

13. The transport conveyor according to claim 10, wherein the conveyor chain is substantially borne by the hinging pins, moving over the guiders.

* * * * *

UNITED STATES PATENT AND TRADEMARK OFFICE
CERTIFICATE OF CORRECTION

| | |
|---|---|
| PATENT NO. | : 11,186,439 B2 |
| APPLICATION NO. | : 16/980932 |
| DATED | : November 30, 2021 |
| INVENTOR(S) | : Egbert Gerrit Hoff |

It is certified that error appears in the above-identified patent and that said Letters Patent is hereby corrected as shown below:

In the Claims

Column 10, Line 24, Claim 12, after "set" insert -- of --

Column 10, Line 29, Claim 13, after "conveyor" insert -- curve --

Signed and Sealed this
Seventeenth Day of May, 2022

*Katherine Kelly Vidal*

Katherine Kelly Vidal
*Director of the United States Patent and Trademark Office*